United States Patent
Jabbour et al.

(10) Patent No.: US 11,226,481 B2
(45) Date of Patent: Jan. 18, 2022

(54) METHODS AND APPARATUSES FOR DESIGNING OPTICAL SYSTEMS USING MACHINE LEARNING WITH DELANO DIAGRAMS

(71) Applicants: Carl Zeiss AG, Oberkochen (DE); Carl Zeiss SMT GmbH, Oberkochen (DE)

(72) Inventors: Toufic Jabbour, Aalen (DE); Christian Wojek, Aalen (DE); Christoph Menke, Oberkochen (DE); Markus Schwab, Aalen (DE)

(73) Assignees: Cad Zeiss AG, Oberkochen (DE); Carl Zeiss SMT GmbH, Oberkochen (DE)

(*) Notice: Subject to any disclaimer, the term of this patent is extended or adjusted under 35 U.S.C. 154(b) by 659 days.

(21) Appl. No.: 16/142,947

(22) Filed: Sep. 26, 2018

(65) Prior Publication Data
US 2019/0094532 A1    Mar. 28, 2019

(30) Foreign Application Priority Data
Sep. 28, 2017 (DE) .......................... 102017122636.2

(51) Int. Cl.
G02B 27/00 (2006.01)
G06N 3/04 (2006.01)
G06N 3/08 (2006.01)

(52) U.S. Cl.
CPC .......... *G02B 27/0012* (2013.01); *G06N 3/04* (2013.01); *G06N 3/086* (2013.01)

(58) Field of Classification Search
None
See application file for complete search history.

(56) References Cited

PUBLICATIONS

Daniel M. Brown, "Global optimization using the y-ybar diagram," Proc. SPIE 1527, Current Developments in Optical Design and Optical Engineering, (Dec. 1, 1991); doi: 10.1117/12.48634; Total pp. 8 (Year: 1991).*
Yeu-Jent Hu, Der-Chin Chern, Rong-Seng Chang, "Optical lens design by neural network," Proc. SPIE 1780, Lens and Optical Systems Design, 17800C (Apr. 15, 1993); doi: 10.1117/12.142805; Total pp. 9 (Year: 1993).*
John Macdonald, Amanda J. Breese, Nigel L. Hanbury, "Optimization of a lens design using a neural network," Proc. SPIE 1965, Applications of Artificial Neural Networks IV, (Sep. 2, 1993); doi: 10.1117/12.152573; Total pp. 13 (Year: 1993).*
Markus Schwab, Alois Herkommer, "The Delano diagram: a powerful design tool," Proc. SPIE 7100, Optical Design and Engineering III, 71000U (Sep. 27, 2008); doi: 10.1117/12.797672; Total pp. 16 (Year: 2008).*
Tam et al., A hybrid artificial intelligence system for optical lens design, International Journal of Computer Applications in Technology, vol. 13, Nos. 3/4/5, 2000, pp. 229-236 (Year: 2000).*

(Continued)

*Primary Examiner* — Alan Chen
(74) *Attorney, Agent, or Firm* — Myers Bigel, P.A.

(57) ABSTRACT

Methods and apparatuses for designing optical systems are provided. In this case, on a plurality of known optical systems, machine learning is carried out in order to train a computing device. After this training, the computing device can generate a design for an optical system on the basis of parameters describing desired properties of an optical system.

17 Claims, 4 Drawing Sheets

(56) References Cited

PUBLICATIONS

Chang, Rong-Seng "Analytical lens design by microcomputer with artificial intelligence" Proceedings of SPIE, vol. 554:18-24, 1985 International Lens Design Conference (Feb. 14, 1986).
Dilworth, Donald C. "Expert systems in lens design" Proceedings of SPIE, vol. 1354:359-370, 1990 Intl Lens Design Conference (Jan. 1, 1991).
Mouromtsev et al. "Knowledge based engineering system for structural optical design" Frontiers in Artificial Intelligence and Applications, 246:254-272 (2012).
Silver et al. "Mastering the game of Go with deep neural networks and tree search" Nature, 529:484-489 (2016).
Viswanathan et al. "An attempt to develop an "intelligent" lens design program" Proceedings of SPIE, vol. 554:10-17, 1985 International Lens Design Conference (Feb. 14, 1986).
Weller, Scott W. "Neural Network Optimization, Components, and Design Selection" Proceedings of SPIE, vol. 1354:371-378, 1990 International Lens Design Conference (Jan. 1, 1991).
Aunkofer "Überwachtes vs unüberwachtes maschinelles Lernen" Data Science Blog, Jul. 2, 2017 (6 pages).
Shafer "Simple method for designing lenses" 1980 International Lens Design Conference, SPIE 237:234-241.
Livshits et al. "Information Technologies in CAD system for Lens Design" 2009 International Conference on Optical Instruments and Technology, SPIE 7506 (13 Pages).
Anitropova "Simple method for computer-aided lens design with the elements of artificial intelligence" Lens and Optical Systems Design, SPIE 1780:210-213 (1992).
Livshits et al. "Ontology Approach in Lens Design" Modern Information Systems:23-40 (2012).
Zhang et al. "Automatic generation of optical initial configuration based on Delano diagram" Research in Astronomy and Astrophysics:16(1):9 pages (2016).
Dilworth "Application of Artificial Intelligence to Computer-Aided Lens Design" Proc. SPIE 0766, Recent Trends in Optical Systems Design and Computer Lens Design Workshop: 91-99 (1987).
Sutton et al. "Reinforcement Learning: An Introduction" Second Edition, The MIT Press: 548 pages (2018).
"Artificial Neural Network" Wikipedia, retrieved from the Internet, https://en.wikipedia.org/w/index.php?title=Artificial_neural_network&oldid=793286820, 45 pages (Jul. 31, 2017).
"Machine Learning" Wikipedia, retrieved from the Internet, https://en.wikipedia.org/w/index.php?title=Machine_learning&oldid=793203461, 15 pages (Jul. 31, 2017).
Kober et al. "Imitation and Reinforcement Learning Practical learning Algorithms for Motor Primitives in Robotics" IEEE Robotics & Automation Magazine 17(2):55-62 (Jun. 2010).

\* cited by examiner

METHODS AND APPARATUSES FOR DESIGNING OPTICAL SYSTEMS USING MACHINE LEARNING WITH DELANO DIAGRAMS

CROSS REFERENCE TO RELATED APPLICATION

This U.S. non-provisional patent application claims priority under 35 USC § 119 to German Patent Application No. 102017122636.2, filed on Sep. 28, 2017, the disclosure of which is incorporated herein in its entirety by reference.

TECHNICAL FIELD

The present application relates to methods and apparatuses for designing optical systems.

BACKGROUND

The design of optical systems such as, for example, camera lenses or microscope objectives is a complex process comprising a number of stages. In general, firstly the technical requirements of the optical system are analysed. On the basis of the technical requirements, a first design of an optical system is defined, said first design having free parameters. These parameters are then optimized.

For these optimizations of parameters there are powerful software programs which carry out these optimizations of parameters of an initial design very rapidly and efficiently. However, these available software programs have two disadvantages:

Firstly, they can only optimize the initial design, but cannot structurally alter it without human intervention.

Secondly, the success of the optimization depends greatly on the initial design.

This means that if the initial design does not have a suitable structure, the optimization of the system by the software programs cannot achieve satisfactory results. This is because the software programs cannot add or remove lens elements, for example, in order to improve the design.

Some software programs for designing optical systems offer a collection of well-corrected systems from which a user can select an initial design that is well corrected (for example with regard to aberrations). This is helpful only to a limited extent, however, since requirements for new optical systems often do not match the systems offered by the software programs.

Therefore, various procedures exist for attaining an initial design, also referred to as start design, for an optical system. One procedure is described in David Shafer, "A simple method for designing lenses", Proc.SPIE 023, 1980, International Lens Design Conference, 234 (16 Sep. 1980). In this procedure, just two particular types of surfaces, aplanatic and concentric surfaces, are combined to produce various systems.

This method was then extended, as described in I. Antripova—Livshits, "Simple method for computer-aided lens design with the elements of artificial intelligence", Proc.SPIE Vol. 1780, pages 210-213, published Apr. 1993 or I. Livshits et al., "Information technologies in CAD system for lens design", Proc.SPIE 7506, International Conference on Optical Instruments and Technology, 25 Nov. 2009. Here the number of different surfaces is increased to five: aplanatic, concentric with respect to a pupil, concentric with respect to the image, flat and close to the image. The authors of this procedure classify the combination of two types of surface in four groups: basic, correction, wide angle and light powerful. An initial design for an optical system can then be described by a sequence of said groups, as shown for example in the above references.

This type of "functional design" offers a good starting point for a final design, wherein, proceeding from a design of this type, an optimization can then be carried out with the software packets mentioned above.

However, this procedure provides only limited assistance here in finding an initial design. Although the mentioned classification of different elements helps to understand the function of each element, it still gives no indication of how ultimately an optical system is to be assembled for a specific purpose. The references state that expert knowledge acquired through long experience in the field of optical system design is used here. However, this requires precisely such knowledge gained over many years and does not enable the designing of optical systems to be automated.

Another procedure is described by Donald Dilworth (see e.g. Applications of Artificial Intelligence to Computer-Aided Lens design, SPIE Vol. 766 Recent Trends in Optical Systems Design; Computer Lens Design Workshop (1987)), wherein wavefronts are defined within optical systems, wherein the wavefronts serve as it were as interfaces in order to be able to combine parts of optical systems with one another. This allows the combination of parts of optical systems, but only if correspondingly identical wavefronts are present.

There is therefore a need to improve the automation of the creation of initial designs of optical systems, which can then be optimized further.

SUMMARY

According to an embodiment, a method for designing optical systems is provided, comprising:

providing a plurality of optical systems, and carrying out a machine learning method on the basis of the plurality of optical systems.

In this way, an apparatus may be trained on the basis of known optical systems in order later then to be able to provide designs of optical systems. The plurality of optical systems thus serves as a plurality of training examples for the machine learning method. Optical systems as training examples can be generated by simulations or with the aid of a sampling method (see, for example, Reinforcement Learning: An Introduction, Richard S. Sutton and Andrew G. Barto, Second Edition, in progress MIT Press, Cambridge, Mass., 2017, online incompleteideas.net/sutton/book/bookdraft2017june19.pdf, version as on 26 Sep. 2017). Moreover, it is possible to make use of known design rules for designing optical systems for producing optical systems as training examples or to use methods of imitation learning, which derive rules by observing an expert (see, for example, IEEE ROBOTICS & AUTOMATION MAGAZINE, VOL. 17, NO. 2, JUNE 2010 1 Imitation and Reinforcement Learning Practical Learning Algorithms for Motor Primitives in Robotics by Jens Kober and Jan Peters).

Providing the plurality of optical systems may in some embodiments be carried out in the form of a database, on the basis of which the learning method is then carried out. However, additionally or alternatively, providing the plurality of optical systems may also comprise designing the plurality of optical systems by an optical designer, wherein the learning method is then an imitation learning method which as it were observes the optical designer during designing and thus trains the apparatus accordingly.

Carrying out the machine learning in some embodiments may comprise training an artificial neural network. Neural networks are particularly preferred here since they constitute a well-understood trainable system. In this case, implementing the machine learning method may comprise neural networks having a plurality of layers, which are often used in practice.

As learning methods, some embodiments may use methods of reinforcement learning, e.g. deep reinforcement learning, in order to alter the basic configuration of optical surfaces of an optical system in order to attain the optical systems that are used as training examples, for example in the database described above.

Providing a plurality of optical systems may in some embodiments comprise classifying the plurality of optical systems in order to provide parameters describing the plurality of optical systems, wherein the machine learning is carried out on the basis of the parameters.

The classifying in some embodiments prepares the known designs of optical systems for the machine learning. By means of the machine learning, an apparatus, in particular an apparatus having a neural network, is then trained accordingly, such that the apparatus may then itself create designs of optical systems. More detailed information in this respect can be gathered from the Wikipedia article "Machine Learning" in the English-language edition of Wikipedia, version as on 31 Jul. 2017, and also the article "Artificial Neural Networks", likewise version as on 31 Jul. 2017, in each case with further references. Use is thus made of existing optical systems with their properties in order to train an apparatus with machine learning algorithms, in particular a neural network. Various conventional procedures of machine learning can be used, for example learning by imitation and (deep) reinforcement learning, as mentioned in the above Wikipedia article.

After training, by means of this method, desired parameters of an optical system to be designed may in some embodiments then be transferred to the trained apparatus, and the apparatus then yields a corresponding design that satisfies required system specifications in the best possible way.

For the learning method and/or when using the trained apparatus, it is possible to use a metric that is used for assessing optical systems with regard to their properties. Said metric may be based on Delano diagrams of the optical systems.

The use of Delano diagrams in some embodiments makes it possible to simplify the assessment and determination of parameters of the optical system.

The parameters may in some embodiments comprise first parameters describing components of the plurality of optical systems. In this way, therefore, the optical systems, in particular individual components such as lens elements thereof, are described by means of the first parameters.

The parameters may in some embodiments also comprise second parameters describing optical and mechanical properties of the plurality of optical systems. By means of the second parameters, the optical systems may thus be classified according to their properties.

Moreover, according to an embodiment, a method for designing an optical system is provided, comprising:

feeding parameters describing desired properties of the optical system to an apparatus trained via the method as discussed above, and obtaining a design of an optical system by the apparatus.

It is thus possible, in an automated manner, to provide an initial design for an optical system having desired parameters, which initial design can then be optimized further by conventional optimization methods, for example the software packets mentioned in the introduction. In this case, the parameters can describe the optical system in the same way as the second parameters mentioned above. In this case, the control of the individual optimization steps of the optimization method, in particular the addition and/or removal of optical effective surfaces, can be controlled by a method based on (deep) reinforcement learning, which method can be trained in an implementation for example by methods of imitation learning.

According to a further embodiment, moreover, a computer program on a tangible storage medium is provided comprising a program code which, when executed on a processor, carries out the method as described above.

According to another embodiment, moreover, an apparatus for designing optical systems is provided, comprising a computing device configured to carry out machine learning on the basis of a plurality of optical systems.

The apparatus may be configured to carry out the method as described above.

Furthermore, an apparatus comprising a computing device trained according to one of the above methods is provided according to an embodiment. The explanations regarding the methods apply, mutatis mutandis, to the apparatus.

The above summary serves merely as a brief overview and is not to be construed as limiting.

BRIEF DESCRIPTION OF THE DRAWINGS

Non-limiting embodiments are explained in greater detail below with reference to the accompanying drawings. In the figures.

DETAILED DESCRIPTION

Various embodiments are described below. These embodiments serve merely for illustration and should not be interpreted as restrictive. In particular, other embodiments can have features and components other than those illustrated.

Features, elements or components of different embodiments can be combined with one another in order to form further embodiments. Variations and modifications which are described in respect of one of the embodiments are also applicable to other embodiments. In particular, variations and modifications which are discussed for embodiments of methods are also applicable to corresponding apparatuses, and vice versa.

Figure 1:
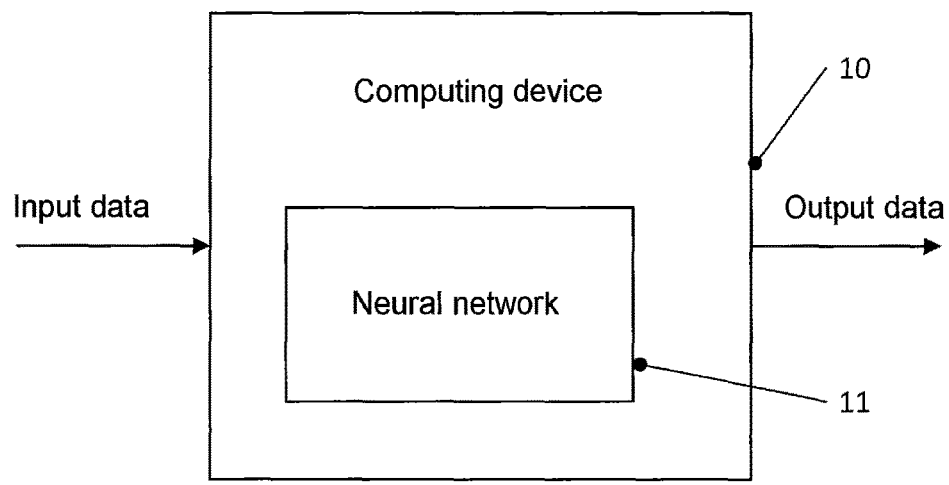
FIG. 1 shows a block diagram of an apparatus in accordance with an embodiment.

FIG. 1 shows an apparatus in accordance with one embodiment. The apparatus in FIG. 1 comprises a computing device 10, for example a computer or else a plurality of computers interconnected via a network. The computing device 10 can also comprise specific hardware components such as application-specific integrated circuits (ASICs), for example, in order to implement the functions described here. In particular, in the embodiment in FIG. 1, the computing device 10 implements one or more artificial neural networks 11. However, embodiments are not restricted to neural networks.

The computing device 10 may receive input data and output output data. In a training phase, the computing device 10 receives a plurality of designs e.g. in the form of first parameters describing the components of the optical systems (e.g. shape, type, material and position of lens elements or mirrors) and second parameters describing properties of the optical systems (e.g. focal length, aperture, etc.). On the basis of these input data, the neural network 11 is trained in a manner known per se in order to create in particular links between the first parameters and the second parameters, i.e. between the construction of the optical systems and the resulting property. In other embodiments, the input data describe design processes by optical designers, and the neural network then "learns" the designing of optical systems by learning methods of imitation learning. Details of this learning will be explained in greater detail later.

After this training phase, desired parameters describing properties of an optical system to be designed can be fed as input data to the computing device 10. These parameters correspond in terms of their function to the second parameters above. The computing device 10 then outputs, as output data, a design for a corresponding optical system by means of the neural network 11 then trained.

Figure 2:
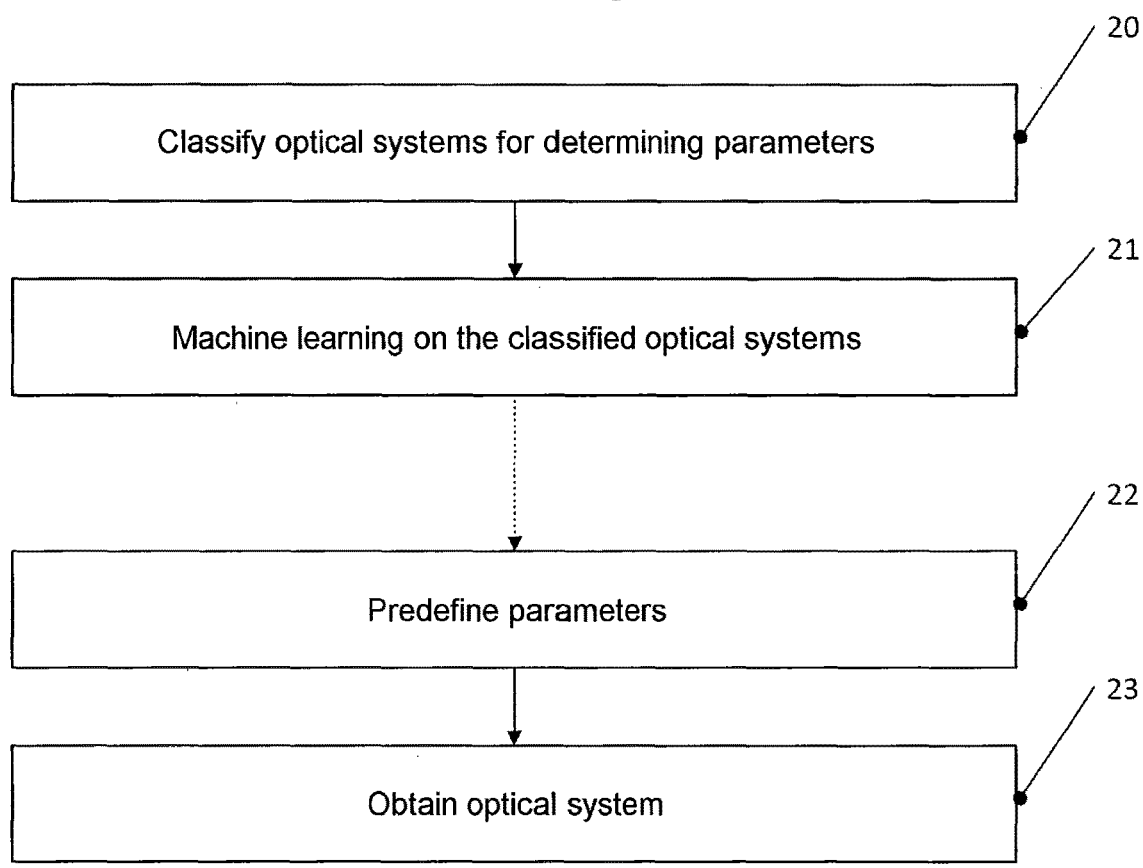
FIG. 2 shows a flow diagram of a method in accordance with an embodiment.

FIG. 2 shows a flow diagram of a corresponding method which may be carried out in the computing device from FIG. 1. The method may be implemented by a computer program, which may be provided on a tangible storage medium like CD, DVD, hard disk, solid state memory or the like.

In step 20, optical systems are optionally classified in order to specify respective first and second parameters of the optical systems in standardized form, i.e. in a form that applies to all optical systems. In this case, the components of optical systems can be specified in accordance with a conventional lens element classification, for example corresponding to the table below:

| Notation | Name |
|---|---|
| J | Aperture (also referred to as "speed" of the optical system) |
| W | Angular range |
| F | Focal length |
| L | Spectral range |
| Q | Image quality |
| S | Back focal length |
| D | Entrance pupil position |

The optical systems and individual elements of the optical systems may also be classified according to their purpose. By way of example, "B" denotes basic elements that determine the basic optical properties of the optical system. "K" denotes correction elements used to correct image aberrations such as chromatic aberrations of the basic elements. "S" denotes wide-angle elements used to determine an angle of view of the optical system. "C" denotes elements used to define, in particular to magnify, the aperture of the optical system.

The letter designations above serve here merely as an example, and the classification may also be done using other symbols, numbers, characters and the like. Moreover, optical systems or their elements can be classified according to the type of optical surfaces, for example non-planar, near-image surface, surface concentric around a chief ray, surface concentric around a marginal ray, or flat surface. First and second parameters describing the respective optical system are thus determined by means of these classifications.

These parameters will be explained in even greater detail later with reference to FIGS. 3-6. In particular, Delano diagrams can be used for classification, as will be explained in even greater detail later. The optical systems and/or the parameters are then preferably provided in a database.

In step 21, the optical systems thus classified, i.e. the optical systems with their assigned parameters, are then used for machine learning. In this case, by way of example, the neural network 11 from FIG. 1 can be trained. Other types of machine learning as explained above can also be used. Possibilities for this machine learning will now be explained in greater detail.

The machine learning and the designing of optical systems that follows later in steps 22 and 23 may require a metric which can be used to assess the "quality" of an optical system and which is correspondingly usable for optimization methods of optical systems. Aberrations in an optical system are caused by reflection or refraction of light rays by optical elements of the optical system. One metric that is usable in embodiments is a metric that measures the entire deflection angle of all optical elements in a representation of the optical system in a Delano diagram. This is described e.g. in "Automatic generation of optical initial configuration based on Delano diagram", Kai-Yuan Zhang et al., 2016 Res. Astron. Astrophys. 16 007. Delano diagrams will be explained in even greater detail later.

In embodiments, the machine learning is based on methods of reinforcement learning, in particular of (deep) reinforcement learning. This learning method can comprise teaching the neural network 11 or some other system to be trained to reproduce the already known optical systems from step 20. By way of example, an optical system having the second parameters described above can be selected, and the aim is to reproduce this optical system by means of the neural network in an optimization process using the metric described above. Manipulating/changing the optical system by the optimization process (also referred to as "policy") may be carried out using one or more of the following variants.

Variant 1: "Random Sampling": In this variant, from the available optical systems that one is selected which fulfils the second parameters of the system to be reproduced in the best possible way, wherein the system to be reproduced is excluded from the selection. For the optimization, various components corresponding to the first parameters are then randomly removed, added or permuted in order to minimize the metric described above. In this case, the random distribution from which new systems are drawn can assume various forms (see, for example, Reinforcement Learning: An Introduction, Richard S. Sutton and Andrew G. Barto, Second Edition, in progress MIT Press, Cambridge, Mass., 2017, online incompleteideas.net/sutton/book/bookdraft2017june19.pdf, version as on 26 Sep. 2017).

Variant 2: Database rules: Here, too, firstly as in variant 1, from the available optical systems that one is selected which fulfils the second parameters of the system to be reproduced in the best possible way. Instead of random changes, here changes are carried out in accordance with database rules. In other words, this involves selecting permutations of the first parameters from the many optical systems which are provided for training in a database.

Variant 3: "Imitation Learning": Here the neural network is trained by the latter following design steps that are carried out by experienced optical designers of optical systems (see, for example, IEEE ROBOTICS & AUTOMATION MAGAZINE, VOL. 17, NO. 2, JUNE 2010 1 Imitation and Reinforcement Learning Practical Learning Algorithms for Motor Primitives in Robotics by Jens Kober and Jan Peters). Every design step that is carried out by the designer can be converted into a Delano diagram, for example, and thus be tracked by the network to be trained.

It should be noted that the trained network may be used by a self-observation process to identify design rules in some embodiments. In particular, with an appropriately large number of training examples it may even be possible to find design rules that are not yet known to designers of optical systems.

With step 21, the training phase is then concluded. Afterwards, the apparatus thus trained can then be used for designing optical systems in accordance with steps 22 and 23. In this case, step 22 involves predefining desired parameters for the optical system, such as, for example, aperture, focal length, image quality and the like, as explained above. In step 23, an optical system is then output for example by means of the trained neural network 11. Said optical system can then be optimized, as explained in the introduction, as an initial design for an optimization process by means of the conventional software packets mentioned in the introduction. As soon as the neural network is then trained, design rules are thus known to the network, and it can use these rules in conjunction with an optimization method in order to output a "design vector" having first parameters describing an optical system that meets conditions predefined by second parameters. The same metric, in particular the metric described above, that was also used during training can be used for this purpose.

Figure 3A:
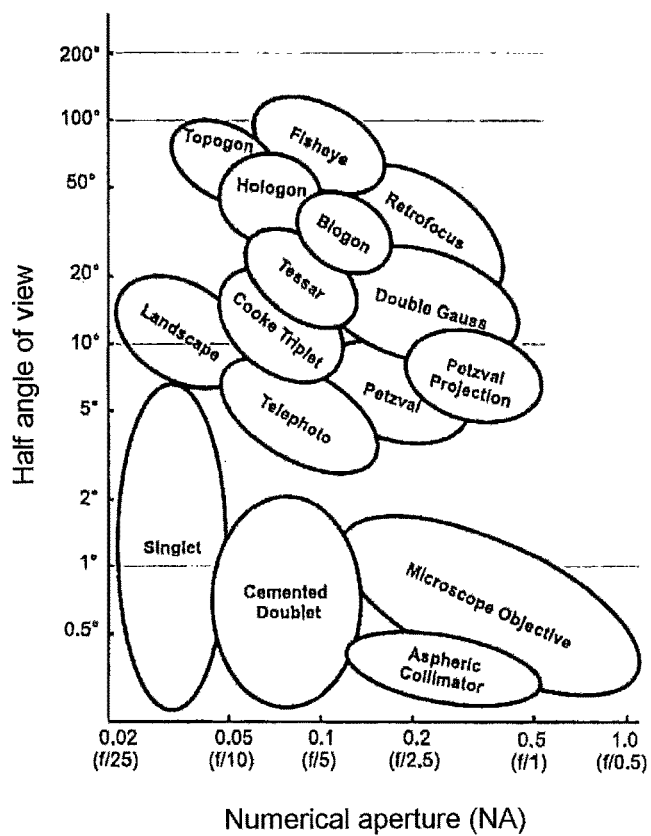
FIGS. 3A and 3B show diagrams for illustrating a classification of different optical systems.
Figure 3B:
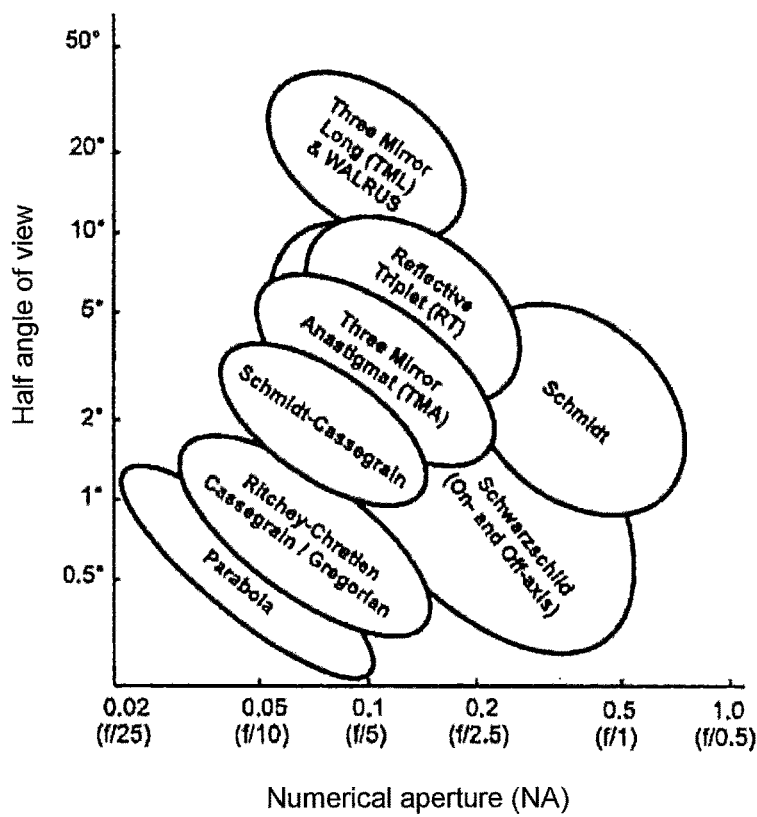

The classification in step 20 in FIG. 2 will be explained in even greater detail below with reference to FIGS. 3-6. FIGS. 3A and 3B show various types of optical systems, classified according to numerical aperture (NA) and half angle of view (FOV Field of View). In this case, numerical apertures and angles of view represent examples of the second parameters mentioned above. In this case, FIG. 3A shows refractive arrangements (essentially arrangements based on lens elements), and FIG. 3B shows reflective arrangements, i.e. arrangements based on mirrors. In addition to the numerical aperture, the f-number f is also specified, which specifies the ratio of the focal length to the diameter of the effective entrance pupil and is often used in photography, for example, to identify the speed of a lens. As can be seen, a plurality of different optical systems exist over a relatively wide range of numerical apertures and angles of view. All these optical systems exist in a plurality of different variants. All these systems can then be classified and used with first and second parameters for machine learning as discussed.

Parameters of optical systems, in particular the first parameters mentioned, may be obtained from Delano diagrams in some embodiments. Moreover, as explained above, a metric may be created on the basis of the Delano diagrams in some embodiments, which metric can be used to assess optical systems both during machine learning (step 21) and during the automatic creation of a design (step 23). A Delano diagram essentially plots the distance between a marginal ray and an optical axis against the distance between the chief ray and the optical axis. This will now be explained with reference to FIGS. 4A and 4B.

Figure 4A:
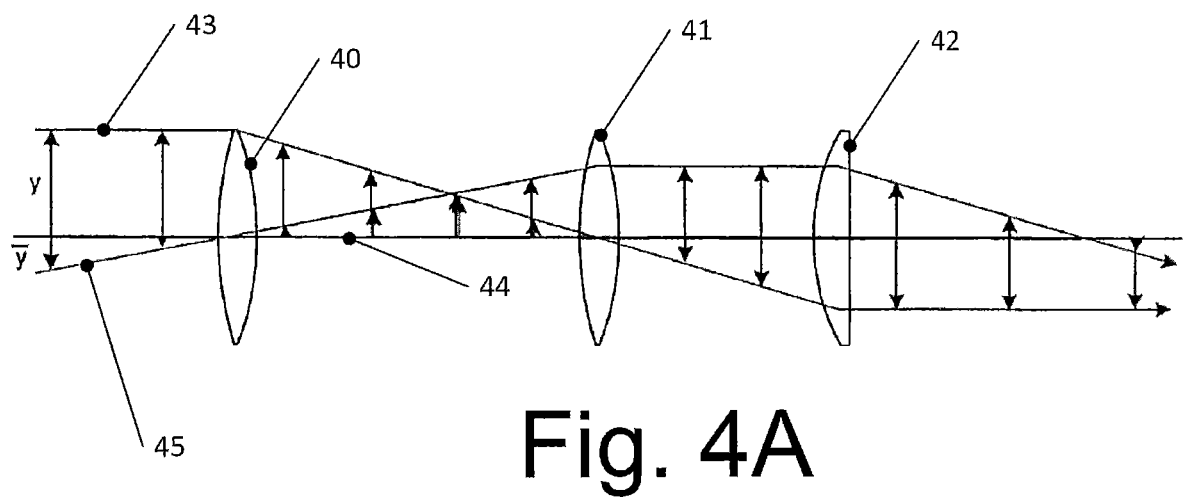
FIG. 4A shows an optical system for illustrating Delano diagrams.

FIG. 4A shows one example of an optical system comprising an entrance lens element 40, which defines an entrance pupil, a field lens element 41 and a collimator lens element 42. A marginal ray 43 and a chief ray 45 and also their distances y, $\bar{y}$ from the optical axis 44 are likewise depicted.

Figure 4B:
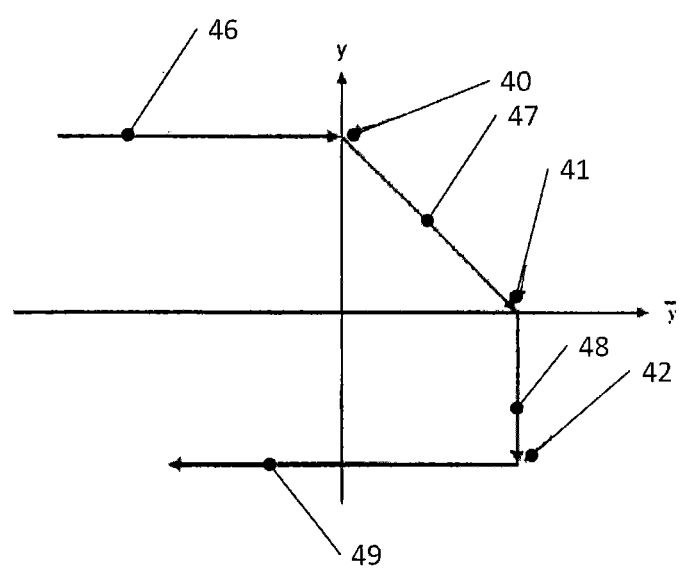
FIG. 4B shows a Delano diagram of the system from FIG. 4A.

FIG. 4B shows a corresponding Delano diagram in which y is plotted against $\bar{y}$. A portion 46 identifies the beam path as far as the lens element 40. At the position of the lens element 40, the light is refracted, which is mirrored in a change in direction of the portion 47 relative to the portion 46. A further light refraction takes place at the lens element 41, which leads to a further change in direction corresponding to the portion 48. A last light refraction takes place at the lens element 42, which then leads to a profile corresponding to the portion 49. The changes in direction upon refraction give information about whether a positive refractive power (for example beam focusing) or a negative refractive power (for example beam expansion) is represented. In the simple example in FIG. 4B it is assumed that the lens elements are thin, such that the light refraction at both lens element surfaces was combined at one point. In the case of thick lens elements, the profile within the lens element is also visible in the Delano diagram.

Figure 5:
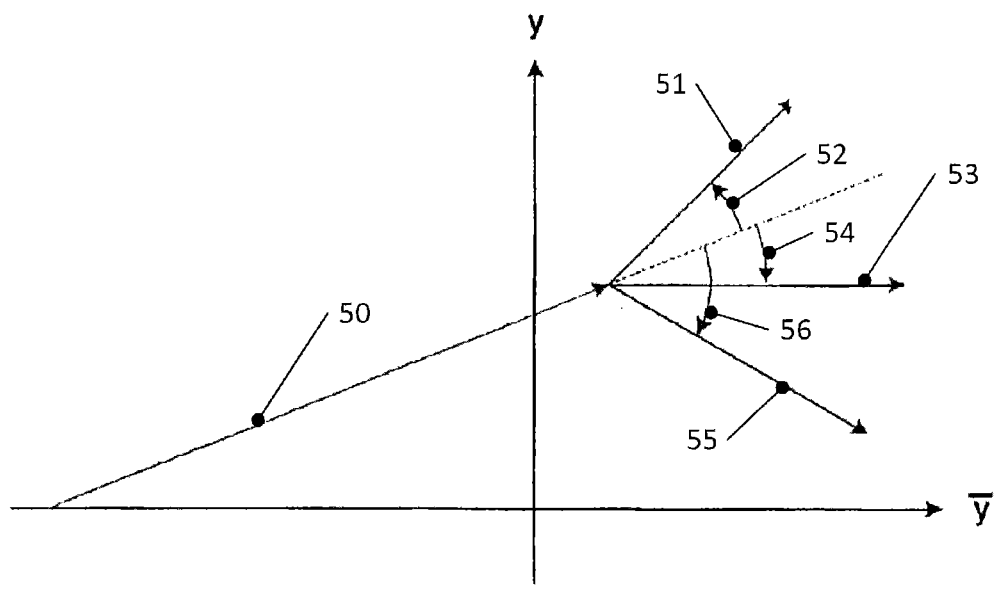
FIG. 5 shows a diagram for illustrating the obtaining of parameters from Delano diagrams.

This is illustrated in FIG. 5. Here a line 50, at different angles 52, 54 and 56, is changed by a corresponding optical element such as a lens element to form lines 51, 53 and 55, respectively. In the case of the line 51, the assigned angle 52 is directed anticlockwise, which corresponds to a negative refractive power, in this case a comparatively small negative refractive power owing to the comparatively small angle 52. In the case of the line 53, the change in direction in accordance with the angle 54 takes place in the clockwise direction, which corresponds to a small positive refractive power. In the case of the line 55, the change in direction takes place by a comparatively large angle 56 in the clockwise direction, which corresponds to a comparatively large positive refractive power. In this way, on the basis of the Delano diagram, an analysis and classification of the individual components, for example lens elements, of the optical system can be performed in order to determine first parameters. In particular, different types of lens elements or else other refractive or reflective elements can be differentiated on the basis of the above angles, which are one example of first parameters. Examples of different types of lens elements are shown in FIGS. 6A-6D together with associated Delano diagrams.

Figure 6A:
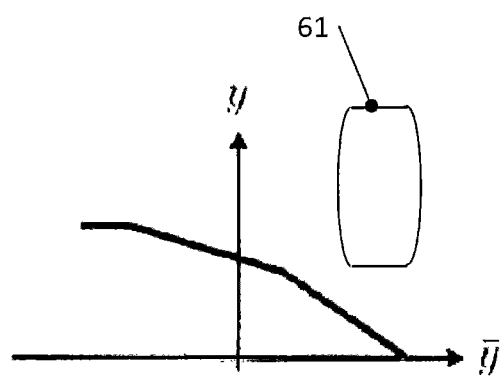
FIGS. 6A-6D show Delano diagrams for various types of lens elements for further illustration.
Figure 6B:
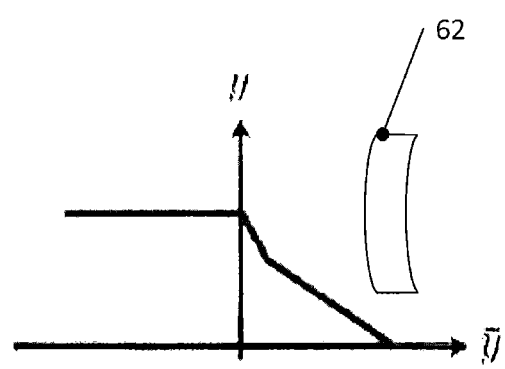
Figure 6C:
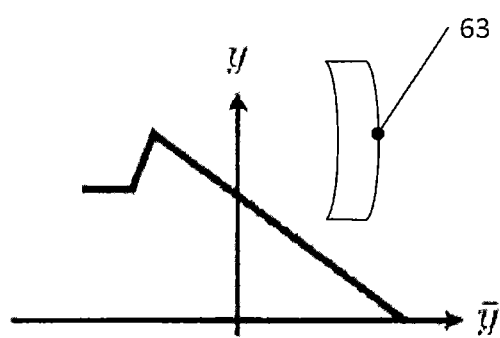
Figure 6D:
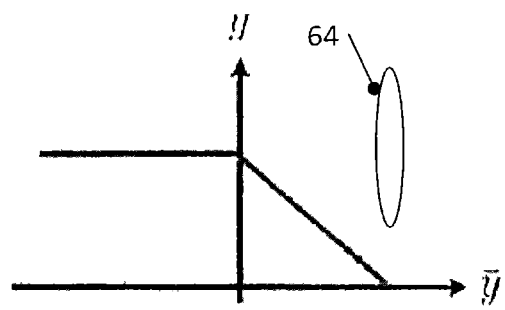

In this regard, FIG. 6A shows a Delano diagram for a comparatively thick lens element 61 having two "kinks" (direction changes) mirroring the surfaces of the lens element 61. FIG. 6D, by contrast, shows the Delano diagram for a thin lens element 64, in which essentially a single kink (or two kinks lying very close together) occur(s). FIGS. 6B and 6C show Delano diagrams for meniscus lens elements 62 and 63, respectively, which are curved in different directions. A light ray incident from the left in the figure is assumed here in each case. As evident in the Delano diagrams, in the case of meniscus lens elements one surface respectively has a positive refractive power, while the respective other surface of the lens element has a negative refractive power, as evident from the changes in direction in the Delano diagram (cf. the explanation concerning FIG. 5).

In this way, different optical systems can be classified (assessed) by means of Delano diagrams. In particular, the different surfaces and elements of the system, as mentioned, can be classified by the respective angle by which the line changes in the Delano diagram. In this regard, by means of a corresponding computer program, each optical system from a set of known optical systems can be transformed into a representation as a Delano diagram, and each surface in the system can then be classified with regard to refractive power, optical aberrations, position with respect to a pupil, etc. On this basis, it is then possible to characterize the type, function and position of each optical element in the system and thus to characterize the respective system with corresponding first parameters as explained above. Consequently, the Delano diagram yields a description of the optical system on the basis of the description of the components and parameters of the optical system, which can then be used as a feature vector for the machine learning.

In this way, optical systems can be described in a standardized manner, which enables the subsequent machine learning, for example the training of the neural network 11.

The designed optical system may then be manufactured.

What is claimed is:

1. A method for designing optical systems, comprising:
   providing a plurality of optical systems, and
   carrying out a machine learning method on the basis of the plurality of optical systems,
   wherein providing a plurality of optical systems comprises classifying the plurality of optical systems in order to provide parameters describing the plurality of optical systems,
   wherein the classifying is carried out based on Delano diagrams of the plurality of optical systems, and
   wherein the machine learning is carried out on the basis of the parameters obtained from the classifying based on the Delano diagrams being used as a feature vector for the machine learning.

2. The method of claim 1, wherein carrying out the machine learning method comprises training an artificial neural network.

3. The method of claim 2, wherein the neural network comprises a plurality of layers.

4. The method of claim 1, wherein the parameters comprise first parameters describing components of the plurality of optical systems.

5. The method of claim 1, wherein the parameters comprise second parameters describing optical properties of the plurality of optical systems.

6. The method of claim 1, wherein the machine learning method comprises a reinforcement learning method.

7. The method of claim 1, wherein providing the plurality of optical systems comprises designing the plurality of optical systems by an optical designer, wherein the machine learning method comprises a method of imitation learning on the basis of the designing.

8. The method of claim 1, comprising:
   feeding parameters describing desired properties after training an apparatus by said machine learning method, and
   obtaining a design of an optical system by the apparatus.

9. The method of claim 8, further comprising manufacturing an optical system according to the design.

10. The method of claim 1, wherein the machine learning method comprises applying a metric based on the Delano diagrams.

11. A tangible storage medium comprising:
    a computer program having a program code which, when executed on a processor, causes the processor to carry out a machine learning method on the basis of a plurality of provided optical systems,
    wherein the machine learning method comprises classifying the plurality of optical systems in order to provide parameters describing the plurality of optical systems,
    wherein the classifying is carried out based on Delano diagrams of the plurality of optical systems, and
    wherein the machine learning is carried out on the basis of the parameters obtained from the classifying based on the Delano diagrams being used as a feature vector for the machine learning.

12. The storage medium of claim 11, wherein the program code further causes the processor to classify the plurality of optical systems in order to provide parameters describing the plurality of optical systems, wherein the machine learning is carried out on the basis of the parameters.

13. An apparatus for designing optical systems, comprising:
    a computing device configured to carry out machine learning on the basis of a plurality of optical systems to train the computing device,
    wherein providing a plurality of optical systems comprises classifying the plurality of optical systems in order to provide parameters describing the plurality of optical systems,
    wherein the classifying is carried out based on Delano diagrams of the plurality of optical systems, and
    wherein the machine learning is carried out on the basis of the parameters obtained from the classifying based on the Delano diagrams being used as a feature vector for the machine learning.

14. The apparatus of claim 13, wherein the apparatus is configured to classify the plurality of optical systems in order to provide parameters describing the plurality of optical systems, wherein the machine learning is carried out on the basis of the parameters.

15. The apparatus of claim 14, wherein providing a plurality of optical systems comprises classifying the plurality of optical systems in order to provide parameters describing the plurality of optical systems, wherein the machine learning is carried out on the basis of the parameters.

16. The apparatus of claim 14, wherein the parameters comprise first parameters describing components of the plurality of optical systems.

17. The apparatus of claim 13, wherein the computing device is configured to provide a design of an optical system based on parameters describing desired properties of the system and based on the training.

* * * * *